United States Patent
Grass et al.

(10) Patent No.: US 8,821,734 B2
(45) Date of Patent: *Sep. 2, 2014

(54) METHOD FOR PURIFYING OIL AND APPARATUS THEREFOR

(75) Inventors: Uwe Grass, Stuttgart (DE); Mike Schmid, Tübingen (DE); Andreas Widmaier, Herrenberg (DE)

(73) Assignee: Mahle International GmbH (DE)

( * ) Notice: Subject to any disclaimer, the term of this patent is extended or adjusted under 35 U.S.C. 154(b) by 505 days.

This patent is subject to a terminal disclaimer.

(21) Appl. No.: 12/809,231

(22) PCT Filed: Dec. 4, 2008

(86) PCT No.: PCT/EP2008/066756
§ 371 (c)(1), (2), (4) Date: Oct. 6, 2010

(87) PCT Pub. No.: WO2009/080457
PCT Pub. Date: Jul. 2, 2009

(65) Prior Publication Data
US 2011/0017650 A1    Jan. 27, 2011

(30) Foreign Application Priority Data
Dec. 21, 2007  (DE) .......................... 10 2007 062 100

(51) Int. Cl.
 *B01D 35/16*  (2006.01)
(52) U.S. Cl.
 USPC ....... 210/767; 210/248; 210/444; 210/497.01
(58) Field of Classification Search
 USPC .............. 210/248, 433.1, 436, 444, 453, 472, 210/493.2, 497.01, 438, 767
 See application file for complete search history.

(56) References Cited

U.S. PATENT DOCUMENTS

| | | | |
|---|---|---|---|
| 4,384,474 A |  | 5/1983 | Kowalski |
| 4,929,354 A | * | 5/1990 | Meyering et al. ........ 210/321.61 |
| 5,213,682 A | * | 5/1993 | Richardson ...................... 210/86 |

(Continued)

FOREIGN PATENT DOCUMENTS

| | | | |
|---|---|---|---|
| DE | 19538883 A1 | 4/1997 | |
| DE | 19951085 A1 | 4/2001 | |
| DE | 102006028148 | * 12/2007 | ............. F02M 37/22 |
| DE | 102006028148 A1 | 12/2007 | |

(Continued)

OTHER PUBLICATIONS

English abstract provided for DE-19538883.

(Continued)

*Primary Examiner* — Matthew O Savage
(74) *Attorney, Agent, or Firm* — Rader, Fishman & Grauer PLLC

(57) ABSTRACT

An oil purifying liquid filter, having an annular ring element receiving space, wherein the ring element has two axial end disks, a cover selectively fastened to a housing to close the receiving space, an inlet that is formed within the housing on a crude side, an outlet that is formed within the housing on a pure side, a first additional opening that is formed within the housing, a second additional opening that is formed within the cover, a first closure that is formed on the first end disk of the filter element in order to close the first additional opening, and a second closure that is formed on the second end disk of the filter element to selectively close the second additional opening.

14 Claims, 3 Drawing Sheets

(56) References Cited

U.S. PATENT DOCUMENTS

| | | | |
|---|---|---|---|
| 5,902,479 A | 5/1999 | Fukumori et al. | |
| 6,706,181 B1 | 3/2004 | Baumann et al. | |
| 7,390,407 B2 * | 6/2008 | Weindorf et al. | 210/234 |
| 7,887,701 B2 * | 2/2011 | Schmid et al. | 210/248 |
| 2002/0036165 A1 * | 3/2002 | Sommer et al. | 210/438 |
| 2009/0230048 A1 | 9/2009 | Braunheim | |
| 2010/0326392 A1 * | 12/2010 | Grass et al. | 123/196 A |
| 2011/0089091 A1 * | 4/2011 | Grass et al. | 210/90 |

FOREIGN PATENT DOCUMENTS

| | | |
|---|---|---|
| EP | 1229985 A1 | 8/2002 |
| JP | 10-109006 A | 4/1998 |
| WO | WO-2005/007267 A1 | 1/2005 |

OTHER PUBLICATIONS

International Search Report.

* cited by examiner though providing only the essence of the invention, do not necessarily reflect an actual embodiment.

METHOD FOR PURIFYING OIL AND APPARATUS THEREFOR

CROSS-REFERENCES TO RELATED APPLICATIONS

This application claims priority to German patent applications DE 10 2007 062 100.2 filed on Dec. 21, 2007, and PCT/EP2008/066756 filed on Dec. 4, 2008, both of which are hereby incorporated by reference in their entirety.

TECHNICAL FIELD

The present invention relates to a liquid filter, especially an oil filter for purifying lubrication oil, in particular for combustion engines of motor vehicles.

BACKGROUND

From EP 1 229 985 B1, a liquid filter is known that has a housing containing a receiving space that can be closed with a cover for accommodating an annular filter element. The known liquid filter comprises further an inlet on the crude side, an outlet on the pure side, and a discharge line through which the receiving space can be emptied after removing the cover. In the mounted state of the liquid filter, this discharge line is arranged at the bottom at the receiving space. Further, a closure is arranged on the filter element, which closure closes the discharge line when the filter element is inserted in the receiving space and when the receiving space is closed by means of the cover. In the known liquid filter, said closure is formed by an eccentrically arranged pin axially projecting from an axial end disk of the filter element. The receiving space of the known liquid filter is closed from above with the cover, and the discharge line is formed at the bottom of the receiving space in the housing. For a simplified finding and inserting of the pin into the discharge line, a concentrically arranged and helically ascending ramp is provided, wherein the discharge line is arranged between a lower ramp end and an upper ramp end. When screwing-on the cover, through the rotation of the filter element and through the sliding of the pin along the ramp, the pin automatically finds the discharge line, can penetrate therein and close the same. In an advantageous embodiment of the known liquid filter, the ramp and the pin can interact according to the key-lock-principle so that a filter element provided with a pin adapted to the ramp can be used in such a manner that the closure finds and closes the discharge line automatically when screwing-on the cover.

With a missing filter element or when using a filter element which is not specifically adapted to the filter housing, a sufficient purification of the respective liquid for the operation of the internal combustion engine can not be ensured. Accordingly, the danger of damage to the internal combustion engine caused by contamination carried along with the respective liquid increases.

SUMMARY

The present invention is concerned with the problem to provide, for a filter device of the above mentioned type, an improved embodiment which is in particular characterized in that the absence of the filter element or the use of a filter element which is not specifically adapted to the filter housing can be prevented in an easier manner.

This problem is solved according to the invention by the subject matters of the independent claims. Advantageous embodiments are subject matter of the dependent claims.

The invention is based on the general idea to assign a first additional opening formed within the housing and a second additional opening formed within the cover to the receiving space, which additional openings can be closed by means of complementary closures formed on the filter element. For this purpose, the filter element has, on a first end disk, a first closure for closing the first additional opening, and, on a second end disk, a second closure for closing the second additional opening. By means of the two additional openings which can be closed separately, the liquid filter can be used properly just with a filter element that has two fitting closures. Since conventional filter elements have only one closure at best, the danger of confusion can be reduced.

In a particularly advantageous manner, special functionalities can be assigned to the two additional openings which can provide that the internal combustion engine can not be switched on in case of a missing, incorrectly mounted, or a wrong filter element. For example, the first additional opening on the housing side can belong to a return line which, in particular, communicates with a comparatively pressureless reservoir. When the first closure is missing, due to the low back pressure, the liquid is supplied during the operation of the internal combustion engine primarily through the return line arranged on the crude side so that a required minimum pressure can not build up on the pure side. With an appropriate sensor system, this can be detected by the internal combustion engine and can be evaluated accordingly. The same applies correspondingly for a missing second closure if the second additional opening concerns a discharge line integrated within the cover.

According to an advantageous embodiment, the first closure can be arranged eccentrically on the first end disk, in particular if the first end disk is a centrally open end disk. In contrast, in another advantageous embodiment, the second closure can be arranged centrally on the second end disk, in particular if the second end disk is a centrally closed end disk.

At least one of the closures can be formed by an axially projecting pin. The associated additional opening forms a pin receptacle which is complementary thereto. Alternatively, it is possible to form at least one of the closures as a cap which is axially open on one side and which is formed complementary to a nozzle which is insertable into the respective cap and which is formed at the respective associated additional opening.

A filter element according to the invention is hence characterized by two end disks on each of which one closure is formed.

Further important features and advantages arise from the sub-claims, from the drawings, and from the associated description of the Figures based on the drawings.

It is to be understood that the above mentioned features and the features yet to be explained hereinafter can be used not only in the respectively mentioned combination but also in other combinations or alone without departing from the scope of the present invention.

BRIEF DESCRIPTION OF THE DRAWING

Preferred exemplary embodiments of the invention are illustrated in the drawings and are explained in the following description in more detail, wherein identical reference numbers refer to identical, or similar, or functionally identical components.

In the Figures:

FIG. 5 shows schematically a greatly simplified top view of a ramp.

DETAILED DESCRIPTION

Figure 1:
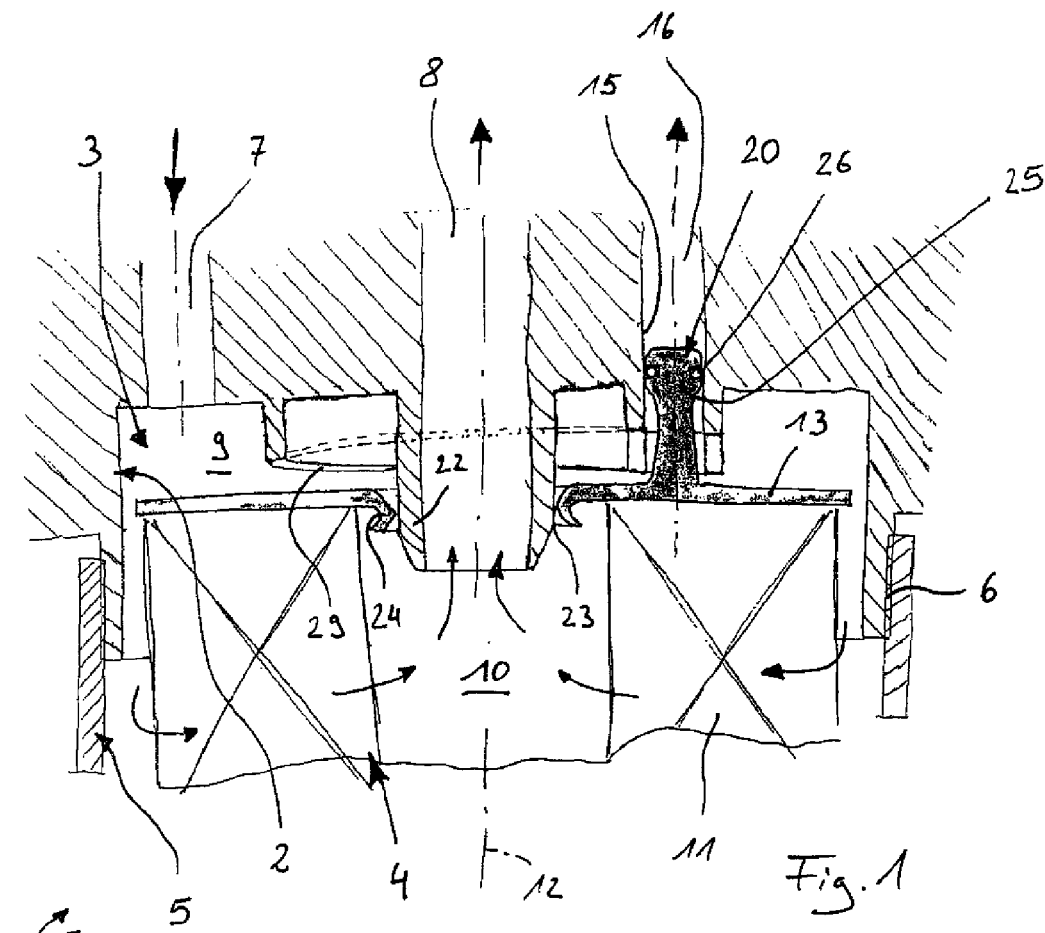
FIG. 1 shows schematically a greatly simplified longitudinal section of a liquid filter in the region of a first end disk.

According to FIGS. 1 to 4, a liquid filter 1 comprises a housing 2, which is only partially illustrated here, and at least one receiving space 3. The receiving space 3 serves for receiving an annular filter element 4 and can be closed by means of a cover 5 which can be fastened for this purpose to the housing 2. Preferably, the cover 5 can be screwed onto the housing 2. A corresponding thread arrangement is designated here with 6. Alternatively, it is principally also possible to fasten the cover 5 on the housing 2 in the manner of a bayonet lock.

The liquid filter 1 can preferably be designed as oil filter for purifying lubrication oil and can be provided in particular for internal combustion engines, which are preferably arranged in motor vehicles. Alternatively, it is principally also possible to design the liquid filter, for example, as fuel filter. Although the liquid filter 1 in the embodiment shown here contains only one receiving space 3 on or in its housing 2, other embodiments with two or more receiving spaces 3 are also possible.

The liquid filter 1 comprises, in addition, an inlet 7 on the crude side for crude liquid or for liquid to be purified, and an outlet 8 on the pure side for pure liquid or cleaned liquid. The liquid flow within the liquid filter 1 occurring during operation is indicated here by arrows. In the present case, the flow through the filter element 4 runs radially from outside inwards; however, in principal, a different construction is also conceivable. Within the receiving space 3, the filter element 4 separates a crude side 9, which is preferably arranged on the outside, from its interior 10, hence from a pure side 10 which is arranged here on the inside. For this, the filter element 4 has an annular filter body 11 which extends coaxial to a longitudinal center axis 12. On each of its axial ends, the filter body 11 is connected with one end disk in a tight manner. This involves a first end disk 13 facing the housing 2 and a second end disk 14 facing the cover 5. The filter body 4 which, in particular, consists of a conventional filter material such as, e.g., paper or non-woven material, can be glued, or welded, or plasticized to the respective end disk 13, 14.

The housing 2 has a first additional opening 15 which communicates in the preferred embodiment shown here with a return line 16, or which forms the inlet region of this return line 16. The return line itself communicates, for example, with a comparatively pressureless reservoir. For example, a pump supplies the liquid from this reservoir to the intake 7. Furthermore, the cover 5 has a second additional opening 17. The latter can in particular communicate with a discharge line 18, which advantageously communicates here with an environment 19. Return line 16 and discharge line 18 are advantageously arranged on the crude side. Accordingly, the additional openings 15 and 17 are also arranged on the crude side in the shown example. In case of a reversed flow through the filter element 4, an arrangement of the additional openings 15, 17 on the pure side is also conceivable.

On its first end disk 13, the filter element 4 has a first closure 20 for closing the first additional opening 15. In addition, the filter element 4 has a second closure 21 on its second end disk 14 for closing the second additional opening 17. Thus, the two closures 20, 21 are arranged opposing one another at the filter element 4.

According to FIG. 1, an inlet nozzle 22 which is coaxial to the longitudinal center axis 12 and which projects axially into the receiving space 3 is assigned to the return line 8. Complementary thereto, the first end disk 13 has a central opening 23 through which the nozzle 22 projects axially and thus projects into the interior 10 of the filter element 4. At the edge of the opening 23, a seal 24 can be integrally formed on the first end disk 13, which seal is abutting against the outside of nozzle 22 in a radially sealing manner. When the opening 23 is arranged centrally, the first closure 20 is arranged eccentrically with respect to the longitudinal center axis 12.

Figure 2:
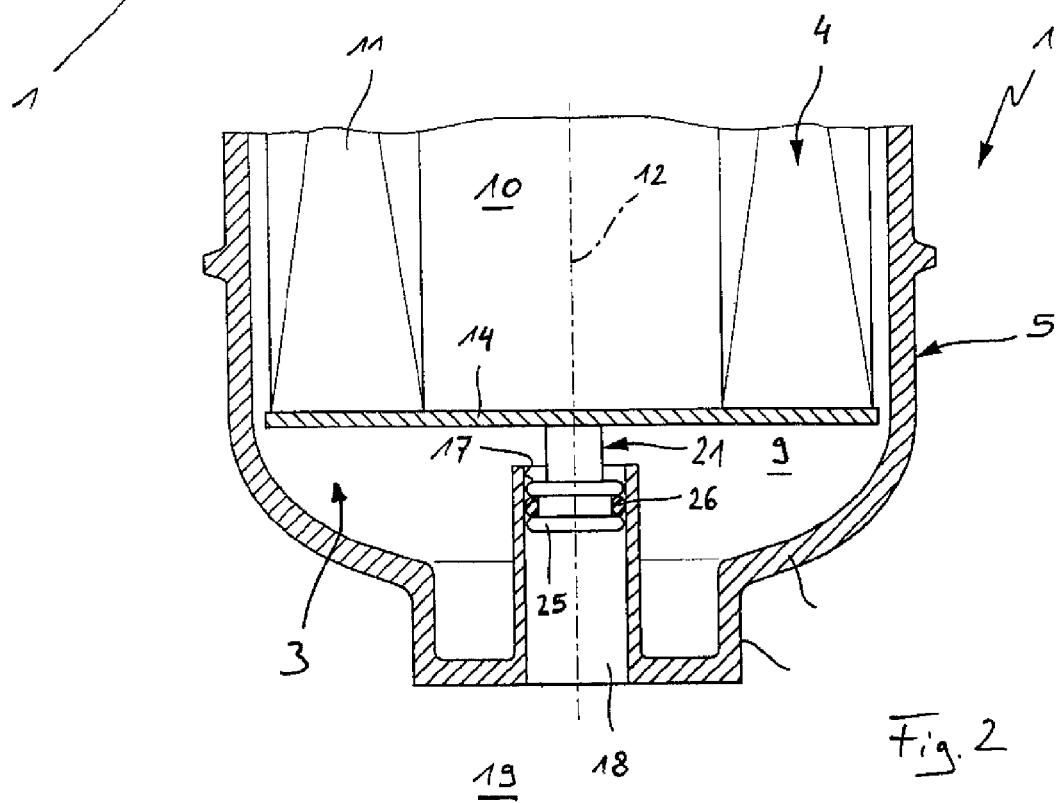
FIGS. 2 to 5 show schematically greatly simplified sectional views as in FIG. 1, but in the region of a second end disk and for different embodiments.
Figure 3:
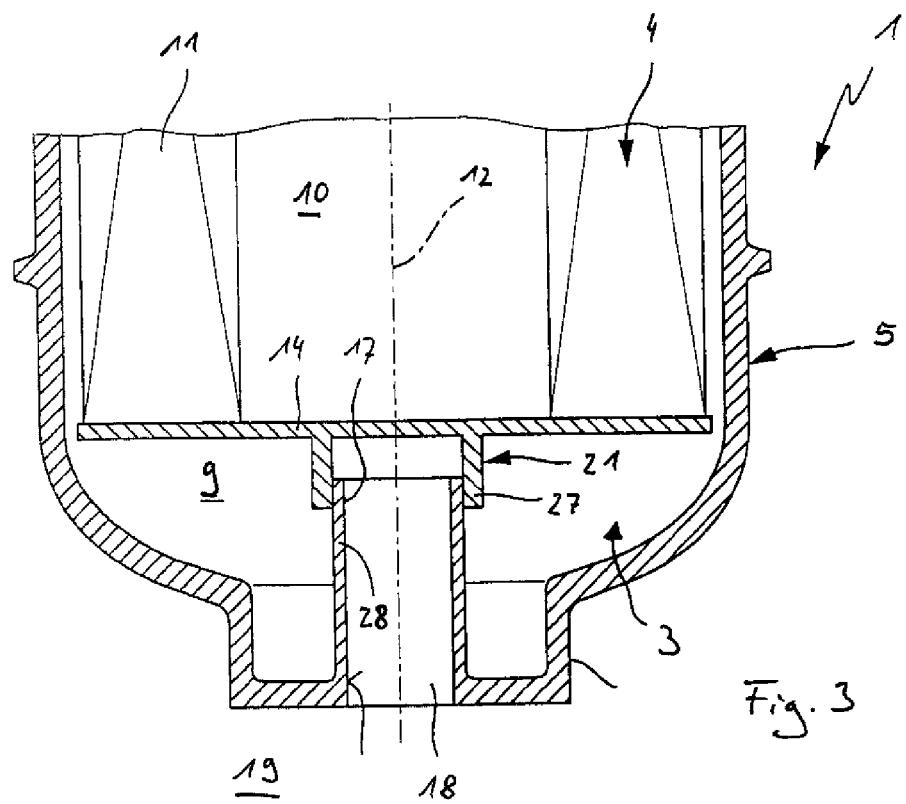
Figure 4:
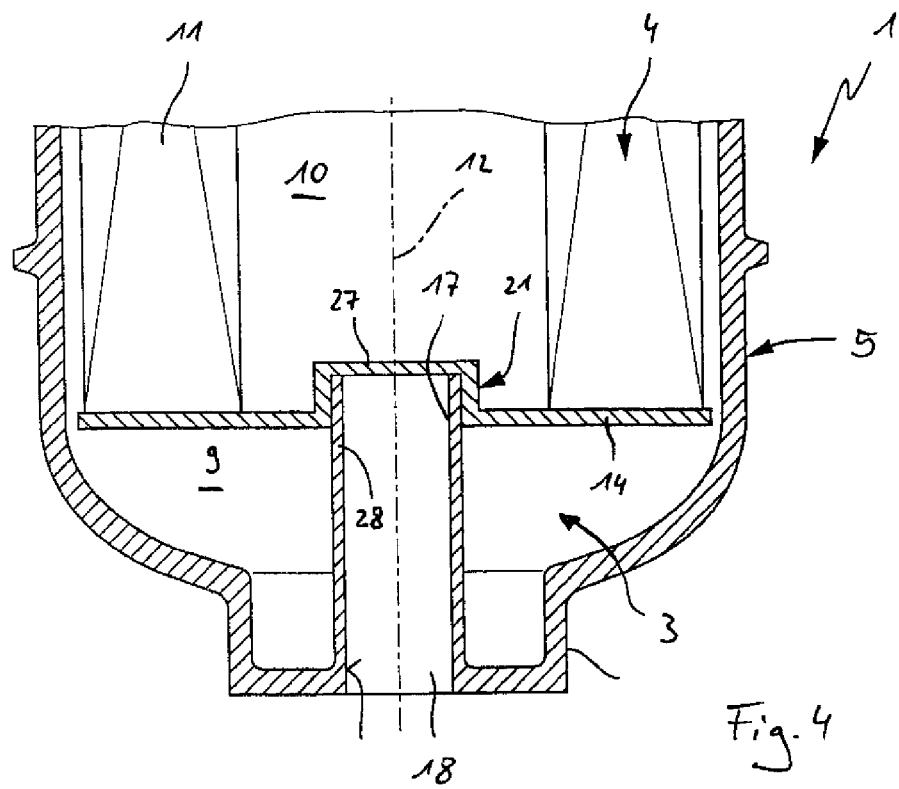

According to the FIGS. 2 to 4, the end disk 14 is formed closed. Hereby it borders the interior 10 of the filter element 4 in axial direction. Preferably, the second closure 21 is arranged centrally here with respect to the longitudinal center axis 12.

According to FIG. 1, the first closure 20 is formed, for example, by a pin 25 axially projecting from the first end disk 13. In the shown mounting position, this pin 25 projects axially into the first additional opening 15 thereby closing the same. For this purpose, the pin 25 can also be equipped with a radial seal 26, e.g. in the form of an O-ring.

According to FIG. 2, the second closure 21 can also be formed by a pin 25 which projects axially from the second end disk 14 and which also can have an optional radial seal 26. Here too, the pin 25 projects in the mounted state axially into the second additional opening 17 to close the same.

According to FIGS. 3 and 4, at least one of the closures 20, 21, here, as an example, the second closure 21, can be formed by means of a cap 27. In the embodiment shown in FIG. 3, the cap 27 projects in a sleeve-shaped manner axially outwards from the filter element 4 or from the filter element's second end disk 14. In contrast, in the embodiment shown in FIG. 4, the cap 27 projects in a pot-shaped manner axially into the interior 10 of the filter element 4.

It is recognizable that thereby an axial plug connection is generated between the first end disk and the housing 2 through the interaction of the first closure 20 and the first additional opening 15. Analogously, the interaction of the second additional opening 17 with the second closure 21 results also in an axial plug connection between the cover 5 and the second end disk 14. Advantageously, the two plug connections are adjusted to one another in such a manner that the plug connection provided between the cover 5 and the second end disk 14 is easier to detach than the one between the housing 2 and the first end disk 13. This can be achieved, for example, in that when attaching the filter element 4, the radial seal 24 of the first end disk 13 snaps into a circumferential ring groove formed on the nozzle 22, or snaps in place behind a circumferential annular bead formed on the nozzle 22.

With this design is achieved that when opening or unscrewing the cover 5, at first the second closure 21 uncovers the second additional opening 17 in such a manner that the receiving space 3 can drain on the crude side, wherefore the respective user positions an appropriate container underneath the discharge channel 18. After the cover 5 is removed, the filter element 4 can then be pulled off.

According to FIG. 1, in the preferred embodiment shown herein, a ramp 29 is arranged on the housing 2, which ramp is arranged concentrically with respect to the longitudinal center axis 12 and which is helically ascending. The ramp 29 thus generates an ascending or descending circular path, the radius of which corresponds to the eccentricity of the first closure 20. Accordingly, the first closure 20 formed as pin 25 can slide on the ramp 29 when the filter element 4 is being mounted. According to FIGS. 5 to 7, the first additional opening 15 is arranged here between a lower ramp end 30 and an upper ramp end 31.

Figure 5:
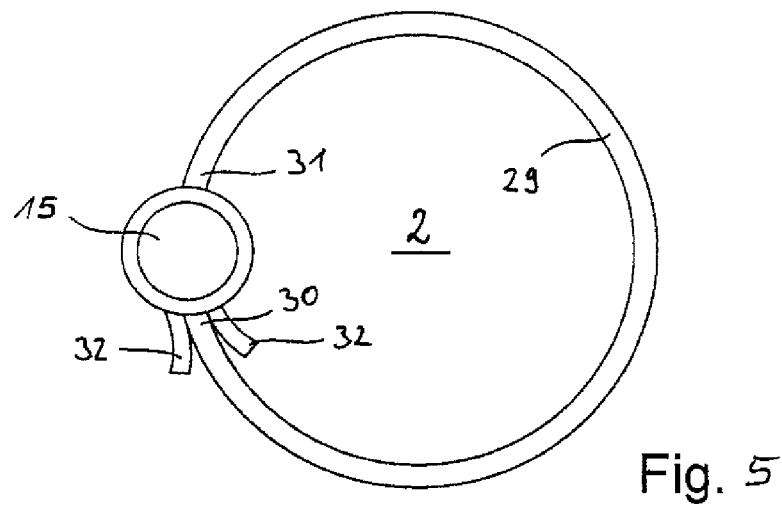
Figure 6:
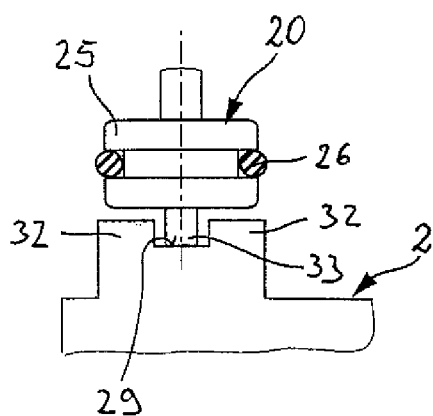
FIGS. 6 and 7 show schematically greatly simplified longitudinal sectional views in the region of the ramp for different embodiments.
Figure 7:
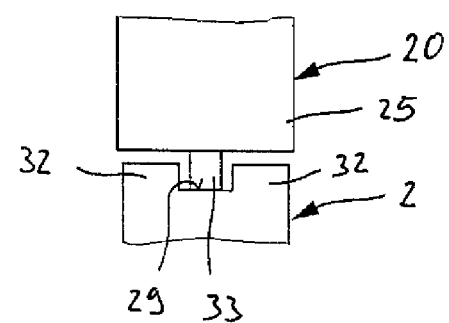

Advantageously, the embodiment equipped with the ramp 29 can also be formed according to the FIGS. 5 to 7 in such a manner that the ramp 29 and the pin 25 or the first closure 20 interact according to the key-lock-principle. This key-lock-principle has the effect that only such filter elements 4 can be properly used with the liquid filter 1 for which the first closure 20 is adapted to the ramp 29 of the housing 2. The relevant proper use includes here that when attaching or rotating the filter element 4, the respective closure 20 finds and closes the first additional opening 15 automatically. In case of filter elements 4 which are not specifically adapted to the liquid filter 1, the key-lock-principle prevents that the potentially provided closure is able to find and close the first additional opening 15 when screwing-on the cover 5. Hereby is intended to achieve that only filter elements 4 can be used which are accurately adapted for the liquid filter 1, for example, to be able to ensure a proper filter function.

To implement this key-lock-principle, according to FIGS. 5 to 7, at each lower ramp end 30, an insertion contour with guiding bodies 32 can be provided, which can be arranged on one side or on both sides of the ramp 29 and which project axially beyond the ramp 29. A pin 25 sliding downwards along the ramp 29 can reach the first additional opening 15 only when it has a projection 33 which is adapted to the guiding bodies 32 and which projects axially from the first closure 20. This projection 33 is, for example, a pin-shaped or tapered or rib-shaped lug which establishes the contact between the pin 25 and the ramp 29. This projection 33 is axially dimensioned in such a manner that it can lift the pin 25 across the guiding elements 32. This means, the pin 25, which slides via the projection 33 on the ramp 29, is spaced apart far enough from the guiding bodies 32 that it can be oriented passing along the guiding bodies 32 in alignment with the first additional opening 15. According to the FIGS. 4 to 7, the projection 33 can contact the ramp between and through the guiding bodies 32, thereby allowing the sliding of the pin 25.

The embodiments of the FIGS. 6 and 7 differ from one another only by the radial seal 26 which is necessary when the respective additional opening 15, 17 to be closed is an inlet region of a channel or the like. Such a radial seal is dispensable, for example, when the respective additional opening 15, 17 is formed by a blind hole or stud hole, thus by a pin receptacle which is axially open on the one side and axially closed on the other side.

The filter element 4 used in the liquid filter 1 is thus characterized by an annular filter body 11 which is provided on each of its axial ends with one end disk 13, 14, wherein each end disk 13, 14 has one closure 20, 21, respectively. At least one of the closures 20, 21 can be formed as a pin 25 which projects axially outwards. At least one of the closures 20, 21 can be formed as a cap 27 which is axially open on one side. One of the closures 20, can be arranged eccentrically with respect to the longitudinal center axis 12 of the filter element 4. The other closure 20, 21 can be arranged centrically with respect to the longitudinal center axis 12.

Advantageously, the respective closure 20, 21, in particular the pin 25, is manufactured as one piece with the associated end disk 13, 14, thus structurally integrated therein. It is also possible to attach the respective closure 20, 21 or pin 25 to the associated end disk 13, 14.

The invention claimed is:

1. An oil purifying liquid filter, comprising:
an annular ring element having a receiving space, wherein the ring element has a first and a second axial end disks,
a cover selectively fastened to a housing to close the receiving space,
an inlet that is formed within the housing on a crude side,
an outlet that is formed within the housing on a pure side, and the outlet includes a nozzle with an inner surface and an outer surface,
a first additional opening that is formed within the housing,
a second additional opening that is formed within the cover,
a first closure that is formed on the first end disk of a filter element to selectively close the first additional opening,
a second closure that is formed on the second end disk of the filter element to selectively close the second additional opening, and
a seal,
wherein the first end disk has a central opening through which the nozzle projects axially into the interior of the filter element, thereby communicating the receiving space with at least one of the inlet and the outlet, and
wherein the seal is disposed between the first axial end disk and the outer surface of the nozzle,
wherein the second closure is formed by a cap that is axially open on one side, and the second additional opening is formed on an axially projecting nozzle that penetrates axially into the cap in order to close the second additional opening.

2. The liquid filter according to claim 1, wherein the first closure is arranged eccentrically on the first end disk.

3. The liquid filter according to claim 2, wherein a concentric, helically ascending ramp is arranged on the housing such that the first additional opening is arranged between a lower ramp end and an upper ramp end.

4. The liquid filter according to claim 2, wherein the second end disk is closed, and wherein the second closure is arranged centrically on the second end disk.

5. The liquid filter according to claim 2, wherein the second additional opening communicates with a discharge line.

6. The liquid filter according to claim 2, wherein the first additional opening communicates with a return line.

7. The liquid filter according to claim 2, wherein the first additional opening communicates with a return line and the second additional opening communicates with a discharge line.

8. The liquid filter according to claim 1, wherein the second end disk is closed, and wherein the second closure is arranged centrically on the second end disk.

9. The liquid filter according to claim 1, wherein the first additional opening communicates with a return line, and wherein the return line extends axially through the housing parallel to the outlet.

10. The liquid filter according to claim 1, wherein one of the closures is formed by a pin which is axially projecting from the respective end disk and which projects axially into the respective additional opening in order to close the same.

11. The liquid filter according to claim 1, wherein the second additional opening communicates with a discharge line.

12. The liquid filter according to claim 1, wherein the first additional opening communicates with a return line and the second additional opening communicates with a discharge line.

13. The liquid filter according to claim 1, wherein the first closure is formed by a pin which is axially projecting from the first end disk and which projects axially into the first additional opening in order to close the same.

14. A method for purifying oil, comprising:

selectively fastening a cover to a housing to close a receiving space of an annular ring element, wherein the ring element has a first and a second axial end disks, providing an inlet that is formed within the housing on a crude side, providing an outlet that is formed within the housing on a pure side, and the outlet has a nozzle with an inner surface and an outer surface, providing a first additional opening that is formed within the housing, providing a second additional opening that is formed within the cover, providing a first closure that is formed on the first end disk of a filter element to selectively close the first additional opening, providing a second closure that is formed on the second end disk of the filter element to selectively close the second additional opening, and providing a seal, axially projecting the nozzle through a central opening of the first end disk and into the interior of the filter element, thereby communicating the receiving space with the outlet, and disposing the seal between the first axial end disk and the outer surface of the nozzle, and providing the second closure formed by a cap that is axially open on one side, and the second additional opening being formed on an axially projecting nozzle that penetrates axially into the respective cap in order to close the second additional opening.

* * * * *